United States Patent [19]

Niino et al.

[11] Patent Number: 4,508,680

[45] Date of Patent: Apr. 2, 1985

[54] METHOD OF MANUFACTURING A ROCKET COMBUSTION CHAMBER

[75] Inventors: Masayuki Niino, Sendai; Nobuyuki Yatsuyanagi, Shibata; Akinaga Kumakawa, Souma; Akio Suzuki, Shibata; Hiromi Gomi, Shibata; Hiroshi Sakamoto, Shibata; Masaki Sasaki, Shibata; Yoshimichi Masuda, Sendai; Ryuzo Watanabe, Sendai; Junjiro Takekawa, Sendai; Etsuo Ohtsuki, Sendai; Terashi Isago, Shibata, all of Japan

[73] Assignee: National Aerospace Laboratory of Science and Technology Agency, Tokyo, Japan

[21] Appl. No.: 500,018

[22] Filed: Jun. 1, 1983

[30] Foreign Application Priority Data

Jun. 8, 1982 [JP] Japan ................................. 57-98355

[51] Int. Cl.³ .................................................. B22F 7/00
[52] U.S. Cl. .................................................. 419/5; 419/8
[58] Field of Search .................................. 419/5, 6, 7, 8

[56] References Cited

U.S. PATENT DOCUMENTS

| 3,531,848 | 10/1970 | Gripshover et al. | 419/5 |
| 3,549,357 | 12/1970 | Osborne | 419/5 |
| 4,431,449 | 2/1984 | Dillon et al. | 419/26 X |

FOREIGN PATENT DOCUMENTS

| 1602258 | 12/1970 | France | 419/8 |
| 28768 | 11/1969 | Japan | 419/8 |
| 491416 | 9/1938 | United Kingdom | 419/8 |
| 149226 | 1/1962 | U.S.S.R. | 419/8 |

*Primary Examiner*—Leland A. Sebastian
*Attorney, Agent, or Firm*—Shapiro and Shapiro

[57] ABSTRACT

The present invention is directed particularly to an improved method using powder metallurgy for the manufacture of the grooved cooling wall of a liquid-propellant rocket combustion chamber. The surface of an inner cylinder constituting the cooling wall is formed with cooling grooves, and these grooves are densely filled up with a filler such as paraffin wax. Thereafter, metal powder which will provide an outer cylinder is compression-molded to a predetermined thickness around the inner cylinder. This metal powder is the same material as the material of the inner cylinder. After the paraffin wax which is the filler is evaporated and removed, the compression-molded metal powder body is sintered in a furnace. During this sintering heat treatment, the inner and outer cylinders are rigidly joined together by the sintering reaction between the atoms of the inner cylinder and the atoms of the metal powder.

9 Claims, 10 Drawing Figures

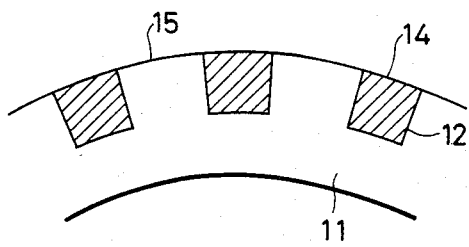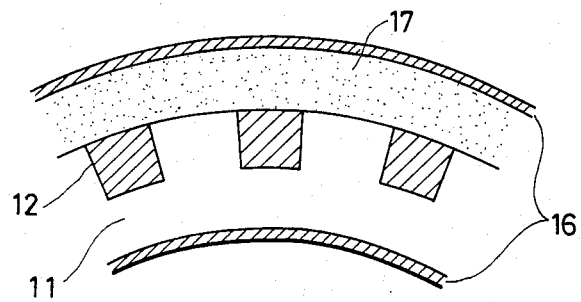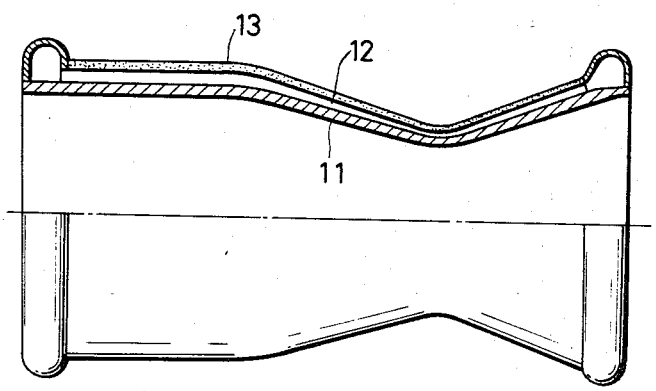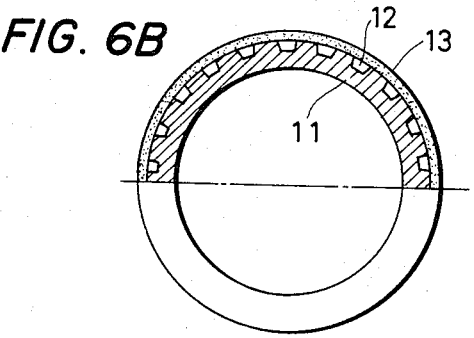

METHOD OF MANUFACTURING A ROCKET COMBUSTION CHAMBER

TECHNICAL FIELD

This invention relates to a method of manufacturing the grooved cooling wall of a combustion chamber, particularly a liquid-propellant rocket combustion chamber.

BACKGROUND ART

In recent years, cooling of the combustion chamber has become the most important task as the combustion pressure of a liquid-propellant rocket engine has increased.

Heretofore, a combustion chamber has been manufactured by bundling several hundred tubes as shown in FIG. 1B of the accompanying drawings which is an enlarged view of the interior of the dotted circle of FIG. 1A. However, such a tube structure is inferior in cooling performance and cannot be adopted in a high combustion pressure engine for large heat load.

For this reason, a combustion chamber having a grooved cooling wall as shown in FIG. 2 of the accompanying drawings has been developed. This grooved cooling wall has a dual merit that the area of the inner surface 1 of the combustion chamber which is in contact with hot combustion gases is small as compared with the tube structure of FIG. 1B while, on the other hand, the area of cooling passages 2, namely, the cooling area, is large, and thus it is a very advantageous structure for an engine of high combustion pressure.

However, the manufacture of such grooved rocket combustion chamber has suffered from numerous problems. That is, in the method of manufacture according to the prior art, grooves 5 extending axially on the combustion chamber as shown in FIG. 3B of the accompanying drawings are formed in an inner cylinder 4 made of copper or a copper alloy as a metal of good heat conductivity as shown in FIG. 3A of the accompanying drawings, by machine work. Subsequently, an outer cylinder 6 is attached to the outer side of the grooved portion in a manner as shown in FIG. 3C of the accompanying drawings and in that case, the inner cylinder 4 and the outer cylinder 6 must be rigidly joined together without the cooling grooves 5 being adversely affected.

The brazing method and the electroforming (electrolytic deposition) method are known as such joining method. However, in the brazing method, the brazing material flows into the cooling grooves 5 to vary the cross-sectional area of the grooves, and this makes it difficult to obtain a predetermined cooling effect and may in most cases lead to the burning of the engine. Also, it is nearly impossible to accomplish brazing uniformly over the entire engine.

On the other hand, the electroforming method is a method of forming an outer cylinder 6 outside the inner cylinder 4 by electroplating and, for instance, used in the manufacture of an engine for a space shuttle. However, the outer cylinder formed by this method readily permits internal stress to be created therein and thus is weak in strength. To suppress such internal stress, it is necessary to delay the electrolysis reaction and a reaction time as long as several hundred to several thousand hours is required for making an outer cylinder of a predetermined thickness. Moreover, the outer cylinder 6 thus manufactured is made of Ni and is therefore poor in ductility, and it is known that the stress created in the engine concentrates in the inner cylinder 4 of Cu, thereby reducing the life of the engine.

SUMMARY OF THE INVENTION

The present invention has as its object to provide a method of manufacturing an outer cylinder which does not have the above-noted disadvantages by covering the inner cylinder of a cooling wall with a rigid outer cylinder.

Such object of the present invention is achieved by a method of manufacturing the cooling wall of a combustion chamber which comprises the steps of making an inner cylinder formed with grooves in the surface thereof, filling up the grooves of the inner cylinder with a filler, compression-molding metallurgy powder of outer cylinder material to a predetermined thickness around the inner cylinder having its grooves filled up with the filler, and sintering the compression-molded powder to thereby form an outer cylinder joined with the inner cylinder.

BRIEF DESCRIPTION OF DRAWINGS

FIGS. 4 to 6B illustrate the working steps in a method of manufacturing a grooved cooling wall in accordance with the present invention.

DETAILED DESCRIPTION OF THE EMBODIMENT

Figure 1A:
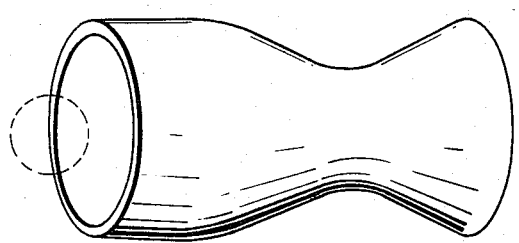
FIGS. 1A and 1B respectively are a pictorial view of a rocket engine combustion chamber and a partial enlarged view of a tube-structured cooling wall.
Figure 1B:
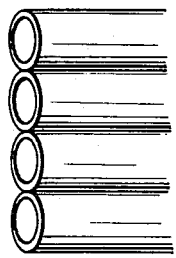
Figure 2:
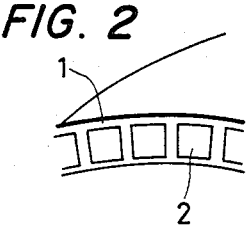
FIG. 2 is a partial enlarged view of the grooved cooling wall of a rocket engine combustion chamber.
Figure 3A:
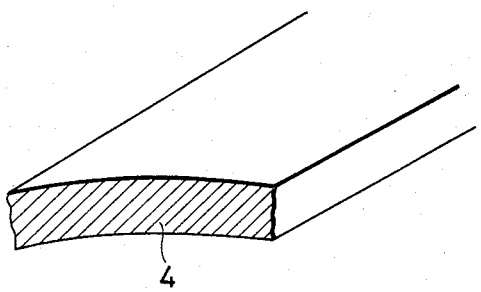
FIGS. 3A to 3C illustrate the working steps in a method of manufacturing a grooved cooling wall in accordance with the prior art.
Figure 3B:
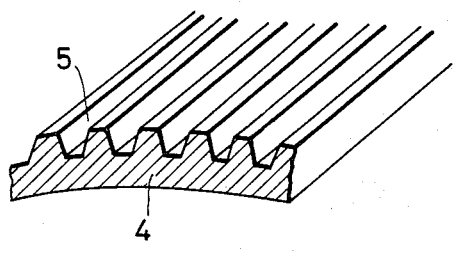
Figure 3C:
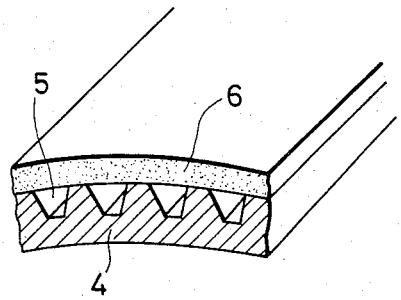

An embodiment of the present invention will hereinafter be described with respect to a case where both of inner and outer cylinders are made of copper.

As shown in FIG. 4, the inner cylinder 11 is made into a predetermined shape by machine work. The grooves 12 of this inner cylinder 11 are filled up with molten paraffin wax 14 so that no hole is created therein. Then, with the wax 14 solidified, a compression pressure of the order of 1 ton/cm$^2$ is applied to the wax 14 as by a hydrostatic pressure to thereby make the wax denser. If the wax 14 precipitates due to this compression, further wax may be added to make the top 15 of the groove partition walls and the surface of the wax 14 flush with each other. If this process is incomplete, there will occur a phenomenon that during formation of the outer cylinder 13 to be described, the outer cylinder 13 becomes curved into the grooves 12 due to the precipitation of the wax 14 and therefore, the above-described operation may be repeated as required and it may be confirmed that precipitation of the wax 14 is not caused by the hydrostatic pressure.

Subsequently, the top 15 of the groove partition walls of the inner cylinder 11 is surface-treated as by sand paper to thereby enhance the sintering property thereof with respect to the outer cylinder.

The inner cylinder 11 subjected to the abovedescribed treatment is placed into a mold having a pressure bag 16 disposed therewithin, and as shown in FIG. 5, the gap between the inner cylinder 11 and the pressure bag 16 is filled up with copper powder 17 which is the same material as the inner cylinder 11. The copper powder 17 may be electrolytic copper powder of 150–400 mesh.

A copper powder layer 17 is then compression-formed as by a hydrostatic pressure method. The compression pressure may be of the order of 1 ton/cm$^2$.

This compression-molded body is installed in an electric furnace and sintered in an atmosphere of hydrogen gas or rare gas or in vacuum to prevent oxidation of the copper powder. At first, the furnace temperature is kept at 400° to 500° C. and the paraffin wax 14 filling the grooves 12 is removed. If the paraffin wax remains, the sintering reaction thereafter will be marred and therefore, the paraffin wax must be removed completely. After it is confirmed visually or by means of an instrument that the paraffin wax has completely evaporated, the furnace temperature is increased to about 900° C. and maintained at this temperature for about two to three hours. The furnace temperature and the time during which the furnace temperature is maintained are more or less variable by the particle diameter of the copper powder used, the compression-molding pressure, etc. and therefore, optimum values thereof must be predetermined by a preparatory test. Due to this heat treatment, the sintering reaction not only of the copper powder but also between the copper atoms of the inner cylinder 11 and the atoms of the copper powder progresses, whereby a tough outer cylinder 13 integral with the inner cylinder 11 is formed.

Finally, the sintered layer formed more or less thickly is finished into a predetermined thickness by machining, whereby the outer cylinder 13 is completed.

Partly cross-sectional views of the completed combustion chamber are shown in FIGS. 6A and 6B.

In the above-described process, powder of ceramics such as alumina or magnesia or other metal powder may be mixed with the paraffin wax filling up the grooves 12. Such mixed wax is great in density and the compressing operation for preventing the precipitation of the wax surface by the hydrostatic pressure may be much less frequently effected than in the case where only paraffin wax is used. However, the added powder still remains in the grooves after the sintering of the outer cylinder and it must be physically or chemically removed by washing or chemical treatment.

According to the present invention, as described above, the outer cylinder is manufactured by using a material of the same quality as the inner cylinder and by powder (dust) metallurgy, and this leads to the following advantages:

(1) The cooling grooves are filled up with a filler during the compression-molding of metallurgy powder and therefore, there is no flow into the grooves as in the case of brazing and predetermined cooling material flow passages are obtained;

(2) The metallurgy powder is uniformly pressed against the inner cylinder as by a hydrostatic pressure and the inner and outer cylinders of the same material are rigidly joined together, and this completely eliminates the possibility of partial exfoliation occuring;

(3) Since an electrochemical method is not resorted to for the formation of the outer cylinder, no internal stress occurs and the working time is much shortened; and (4) Since the inner and outer cylinders are formed of materials of the same quality, the stress created in the rocket combustion chamber does not concentrate in the inner cylinder and this is suitable for a reusable type rocket engine.

We claim:

1. A method for manufacturing the cooling wall of a rocket combustion chamber, comprising the steps of:
    making an inner cylinder of a metallic material formed with grooves in the exterior surface thereof;
    filling up the grooves of said inner cylinder with a filler;
    compression-molding an outer cylinder on the inner cylinder by uniformly compressing metallic material powder of a predetermined thickness against the entire outermost surface of the inner cylinder having its grooves filled up with the filler;
    removing the filler from the grooves of said inner cylinder, whereby the grooves remain as empty cooling channels; and
    sintering the compression-molded powder to join the sintered outer cylinder material to the inner cylinder material and to form integral inner and outer cylinders with cooling channels therebetween.

2. A method according to claim 1, wherein said metallurgy powder is the same as the material of said inner cylinder.

3. A method according to claim 1, wherein said powder is electrolytic copper powder of 150–400 mesh.

4. A method according to claim 1, wherein said filler is paraffin wax.

5. A method according to claim 1, wherein said filler is mixed wax consisting of paraffin wax and ceramic powder added thereto.

6. A method according to claim 1, wherein the step of filling up said grooves with said filler comprises applying a compression pressure to said filler filling up said grooves to thereby make the filler dense, and making the surface of said filler densely filling up said grooves flush with the surface of the groove partition walls.

7. A method according to claim 6, wherein the step of sintering said metal powder is carried out in an atmosphere of hydrogen gas or rare gas or in vacuum.

8. A method according to claim 4, wherein the step of removing the filler comprises evaporating and removing said paraffin wax filled up in the groove by heating it at an evaporating temperature of wax prior to the sintering of said powder at a sintering temperature.

9. A method according to claim 5, wherein the step of removing the filler comprises evaporating and removing said mixed wax by heating it at an evaporating temperature of wax and washing the added ceramic powder, prior to the sintering of said powder at a sintering temperature.

* * * * *